United States Patent

Tults

[11] Patent Number: 5,666,167
[45] Date of Patent: Sep. 9, 1997

[54] BIAS CONTROL APPARATUS FOR A DATA SLICER IN AN AUXILIARY VIDEO INFORMATION DECODER

[75] Inventor: Juri Tults, Indianapolis, Ind.

[73] Assignee: Thomson Consumer Electronics, Inc., Indianapolis, Ind.

[21] Appl. No.: 738,118

[22] Filed: Oct. 25, 1996

Related U.S. Application Data

[63] Continuation of Ser. No. 374,774, Feb. 9, 1995.

[30] Foreign Application Priority Data

Sep. 15, 1992 [GB] United Kingdom ................... 9219505

[51] Int. Cl.⁶ .................................................. H04N 7/087
[52] U.S. Cl. ............................................ 348/465; 348/478
[58] Field of Search ............................... 348/465, 463, 348/468, 478, 473; H04N 7/08, 7/087

[56] References Cited

U.S. PATENT DOCUMENTS

| | | | |
|---|---|---|---|
| 4,620,227 | 10/1986 | Levine et al. | 348/473 |
| 4,656,513 | 4/1987 | Langenkamp | 348/465 |
| 5,136,382 | 8/1992 | Meyer | 348/465 |
| 5,223,930 | 6/1993 | Zato | 348/478 |
| 5,371,545 | 12/1994 | Tults | 348/478 |
| 5,404,172 | 4/1995 | Berman et al. | 348/465 |
| 5,463,423 | 10/1995 | Tults | 348/465 |
| 5,483,289 | 1/1996 | Urade et al. | 348/465 |

FOREIGN PATENT DOCUMENTS

| | | | |
|---|---|---|---|
| 0421897 | 3/1989 | European Pat. Off. | |
| 0103482 | 6/1984 | Japan | 358/142 |
| 61-043886 | 3/1986 | Japan | |
| 62-231575 | 10/1987 | Japan | 348/465 |
| 03239081 | 10/1991 | Japan | 348/465 |

Primary Examiner—Victor R. Kostak
Attorney, Agent, or Firm—Joseph S. Tripoli; Peter M. Emanuel; Robert D. Shedd

[57] ABSTRACT

An auxiliary video information decoder for extracting an auxiliary video information signal from a video signal includes a data slicer and apparatus for adjusting the slicing level of the data slicer. The slicing level is adjusted rapidly until a reference component of the auxiliary information signal is detected during a display interval of the video signal in which auxiliary video information is expected to occur. A count is incremented after display intervals in which the reference component is detected and is decremented after display intervals in which the reference component is not detected. Slicing level adjustment ceases while the count is at least a predetermined number. The apparatus rapidly adapts the slicing level to long-term video signal amplitude changes of significant magnitude (e.g. following a channel change) and maintains a constant slicing level when transient variations occur in the video signal amplitude.

23 Claims, 12 Drawing Sheets

FIG. 8.

| # | Addr | B1 | B2 | B3 | Label | Op | Operand | Comment |
|---|------|----|----|----|-------|-----|---------|---------|
| 214 | 214A | 0E | 0E | | DSBALG | BRSET | 7,STSCODE,DSBMODE | ;IF START BIT HAS NOT DETECTED IN THE LAST |
| 215 | 214D | 3C | 58 | | | INC | IDLECNT | ; 20 FRAMES, REINITIALIZE |
| 216 | 214F | B6 | 5E | | | LDA | IDLECNT | |
| 217 | 2151 | A1 | 14 | | | CMP | #20 | |
| 218 | 2153 | 25 | 03 | | | BLO | ALGX | |
| 219 | 2155 | CC | 20 | 1F | | JMP | INPROCA | |
| 220 | 2158 | 3F | 5E | | | CLR | IDLECNT | |
| 221 | 215B | 0A | 00 | 3C | | BRSET | 5,PORT$A,MFMODE | ;IF BIT5/A=0, EXECUTE STEP 224 |
| 222 | 215D | | | | DSBMODE | | | ;CHECK WHETHER RIC-COUNT IS 3 |
| 224 | 2160 | B6 | 58 | | | LDA | STSCODE | |
| 225 | 2162 | A4 | 03 | | | AND | #$03 | |
| 226 | 2164 | A1 | 03 | | | CMP | #$03 | |
| 227 | 2166 | 26 | 0C | | | BNE | LP1 | |
| 228 | 2168 | 3F | 5B | | | CLR | RICCNT0 | ;IF YES, CLEAR RIC-COUNT=0 COUNTER AND |
| 229 | 216A | B6 | 5D | | | LDA | RICCNT3 | INCREMENT RIC-COUNT=3 COUNTER UP TO 16 |
| 230 | 216C | A1 | 10 | | | CMP | #16 | BEFORE EXITING |
| 231 | 216E | 24 | 23 | | | BHS | LPNX | |
| 232 | 2170 | 3C | 5D | | | INC | RICCNT3 | |
| 233 | 2172 | 20 | 25 | | | BRA | LPNX | |
| 234 | 2174 | A1 | 00 | | LP1 | CMP | #$00 | ;IF RIC-COUNT IS 0, INCREMENT RIC-COUNT =0 |
| 235 | 2176 | 26 | 02 | | | BNE | LP2 | |
| 236 | 2178 | 3C | 5B | | | INC | RICCNT0 | |
| 237 | 217A | 3A | 5D | | LP2 | DEC | RICCNT3 | ;DECREMENT RIC-COUNT=3 COUNTER FOR RIC-COUNT5 |
| 238 | 217C | 26 | 1B | | | BNE | LPNX | OF 0, 1, OR 2 AND EXIT IF CONTENTS > 0 |
| 239 | 217E | 3D | 5B | | | TST | RICCNT0 | ;IF COUNT IN RICCNT3 IS DOWN TO 0, DECIDE |
| 240 | 2180 | 27 | 0A | | | BEQ | LP3 | IF RICCNT0 > 0, DECREASE BIAS BY ONE STEP |
| 241 | 2182 | B6 | 57 | | | LDA | DSCODE | (DO NOT ALLOW WRAP-AROUND!) |
| 242 | 2184 | A1 | 40 | | | CMP | #$40 | |
| 243 | 2186 | 25 | 0E | | | BLO | LPX | |
| 244 | 2188 | A0 | 40 | | | SUB | #$40 | |
| 245 | 218A | 20 | 08 | | | BRA | LP4 | |
| 246 | 218C | B6 | 57 | | LP3 | LDA | DSCODE | ;IF RIICCNT=0, INCREASE BIAS BY ONE STEP |
| 247 | 218E | A1 | C0 | | | CMP | #$C0 | (DO NOT ALLOW WRAP-AROUND!) |
| 248 | 2190 | 24 | 04 | | | BHS | LPX | |
| 249 | 2192 | AB | 40 | | | ADD | #$40 | |
| 250 | 2194 | B7 | 57 | | LP4 | STA | DSCODE | |
| 251 | 2196 | CC | 20 | 26 | LPX | JMP | INPROCB | |
| 252 | 2199 | CC | 20 | 2C | LPNX | JMP | BEGPROC | |

```
                                  ;-----AUTOMATIC BIAS ADJUSTMENT ROUTINE-----
129                         LDA   STSCODE     ; CHECK WHETHER RIC-COUNT IS 3
130  2098  B6 58            AND   #$03
131  209A  A4 03            CMP   #$03
132  209C  A1 03            BNE   LP1
133  209E  26 0A            LDA   RICCNT3     ; IF YES, INCREMENT RICCNT3 UP TO 7
134  20A0  B6 68            CMP   #7
135  20A2  A1 07            BHS   LPX
136  20A4  24 12            INC   RICCNT3
137  20A6  3C 68            BRA   LPX
138  20A8  20 0E            
139  20AA  3A 68      LP1   DEC   RICCNT3     ; ELSE, DECREMENT RICCNT3 AND CHECK FOR 0
140  20AC  26 0A            BNE   LPX
141  20AE  B6 55            LDA   DSCODE      ; IF RICCNT3=0, INCREASE BIAS BY ONE STEP
142  20B0  AB 40            ADD   #$40        ; (WRAP-AROUND IS PERMITTED)
143  20B2  B7 55            STA   DSCODE
144  20B4  A6 03            LDA   #3
145  20B6  B7 68            STA   RICCNT3
146  20B8  20 0E      LPX   BRA   MONWRT      ; EXIT BIAS ADJUSTMENT ROUTINE
```

*FIG. 10*

BIAS CONTROL APPARATUS FOR A DATA SLICER IN AN AUXILIARY VIDEO INFORMATION DECODER

This is a continuation of application Ser. No. 08/374,774, filed Feb. 9, 1995.

FIELD OF THE INVENTION

The present invention relates to detection of information that may be present in a video signal during vertical blanking intervals.

BACKGROUND

A video signal typically includes vertical display intervals, or fields, having a plurality of horizontal line intervals, e.g. 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert an auxiliary information component, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR §§15.119 and 73.682) specifies that digital data corresponding to ASCII characters for closed captioning must be in line 21 of field 1. Future modifications to the standard may permit auxiliary information such as closed caption data to be located in other lines, e.g. line 21 of every field.

Auxiliary video information is extracted from the video signal using a decoder. An important part of a decoder is the data slicer. The data slicer may be a voltage comparator having a video signal carrying auxiliary video information applied to one input. For optimum performance, a reference or "slicing" voltage at a second input of the comparator should be at the midpoint of the peak to peak excursion of the auxiliary video information signal. The output of the comparator would then provide a binary signal representative of the auxiliary information contained in the video signal.

A constant slicing level may not be adequate for all video signals. Video signal levels may vary depending on the source of the video signal. Utilizing a constant slicing level with varying video signal levels may bias the extracted data undesirably toward logic 0 or logic 1 resulting in erroneous data extraction. For example, if the video signal range is 0 IRE to 20 IRE, a slicing level of 10 IRE is desirable while for a video signal range of 0 IRE to 50 IRE, a slicing level of 25 IRE is desirable. If 25 IRE were used as a slicing level for a signal range of 0 IRE to 20 IRE, a logic 1 would never be extracted because the signal never exceeds the slicing level. Thus, it is desirable to adapt the slicing level to the amplitude of the input video signal.

The format of an auxiliary information component such as closed caption data includes provisions to facilitate an adaptive slicing level function. As specified in the FCC standards, a closed caption signal in line 21 begins after the "back porch" interval of the video signal with a 7 cycle burst of a sinusoidal reference waveform designated the "run-in clock" (RIC). The RIC reference component of the auxiliary video data signal is followed in the latter half of the line 21 interval by a data signal component that represents the actual closed caption data. The closed caption data standard establishes that the amplitude of the RIC signal is identical to the amplitude of the data signal. Thus, the average of the RIC signal amplitude is an appropriate slicing level for the subsequent data signal.

One method for developing the slicing voltage is to integrate the sinusoidal RIC signal and use the resulting DC voltage as the bias for the data slicer. A large integrator capacitor may be required to prevent the slicing voltage from changing due to leakage currents discharging the capacitor during the interval between occurrences of auxiliary video data (e.g. the interval from one line 21 to the next for closed caption data). A large capacitor, however, requires long integration intervals to respond to changes in video signal levels when changing the slicing level. For example, in a closed caption signal, the RIC signal is present only for 14 μs (7 cycles of 500 KHz sinewave) at 33.3 ms intervals (period of one frame of video). A large capacitor may require a response time on the order of one second to respond to sudden changes in the signal level. A significant amount of auxiliary video information during the response interval may be undetected.

It may be desirable to include an auxiliary video information decoder in a video signal processing integrated circuit (IC). A large integrating capacitor may, however, be too large to be included in the IC. An extra IC pin would be required for connecting an external integrating capacitor.

Although it may be possible to design a fast integrator with component values that are small enough to be included in an IC, the resulting design may exhibit tight tolerances which may be impractical for an integrated circuit design. More specifically, IC parameters may vary during production. A design having tight tolerances may be incompatible (produce unexpected or undesirable performance) as a result of parameter variations during IC production.

SUMMARY OF THE INVENTION

The present invention resides, in part, in recognition of the described problems and, in part, in providing an auxiliary video information decoder that solves the problem. In accordance with an aspect of the invention, an auxiliary information decoder includes a data slicer and means for adjusting the slicing level bias of the data slicer. The slicing level adjustment means comprises means for detecting a reference component of the auxiliary information signal and means for producing a count of the number of times that the reference component is detected. The slicing level is adjusted until the reference component is detected. The count is incremented after display intervals in which the reference component is detected and is decremented after display intervals in which the reference component is not detected. Slicing level adjustment ceases while the count is at least a predetermined number.

BRIEF DESCRIPTION OF THE DRAWINGS

The invention may be better understood by referring to the drawing in which:

FIGS. 8 and 10 are program listings corresponding to the flowcharts in FIGS. 6 and 8, respectively;

DETAILED DESCRIPTION

Figure 1:
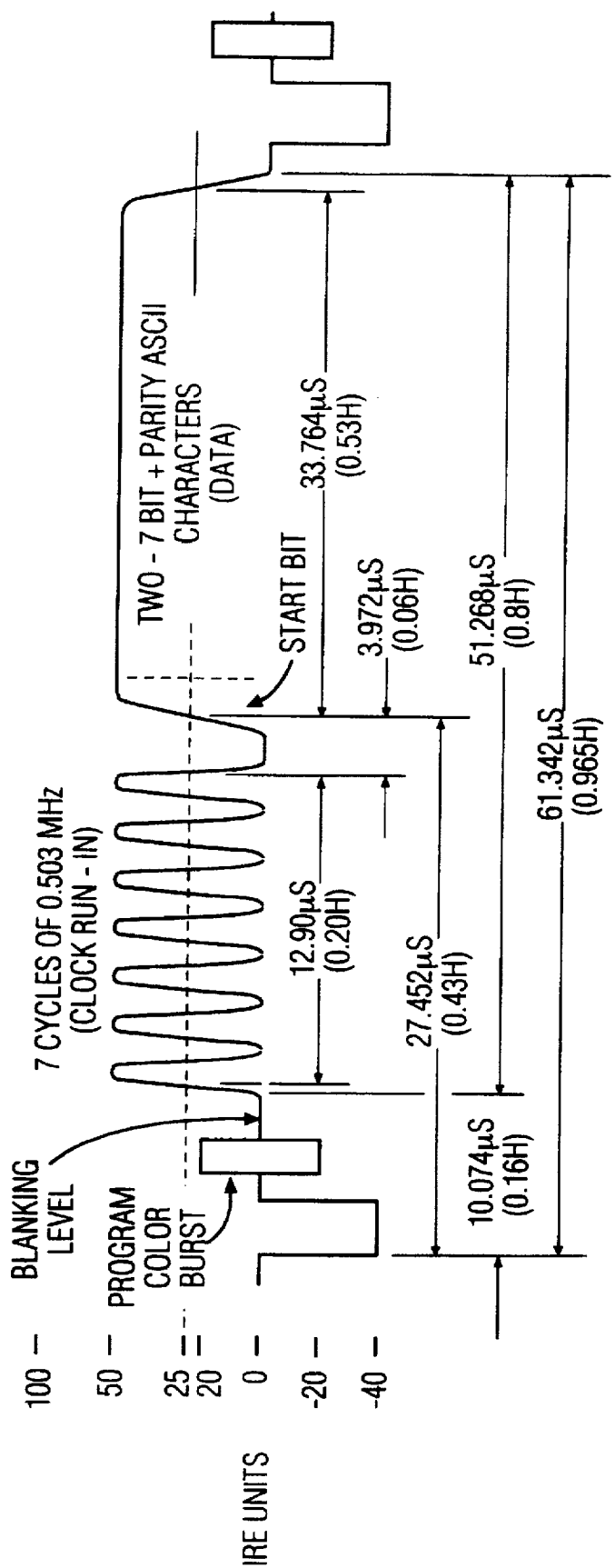
FIG. 1 shows an example of an auxiliary video information signal waveform.

An exemplary embodiment of the invention shown in the drawing is described below in detail in the context of closed caption data that complies with the FCC standard closed caption signal depicted in FIG. 1. As discussed further below, the invention may also be applicable to the extraction of other forms of auxiliary video data such as teletext.

Figure 2:
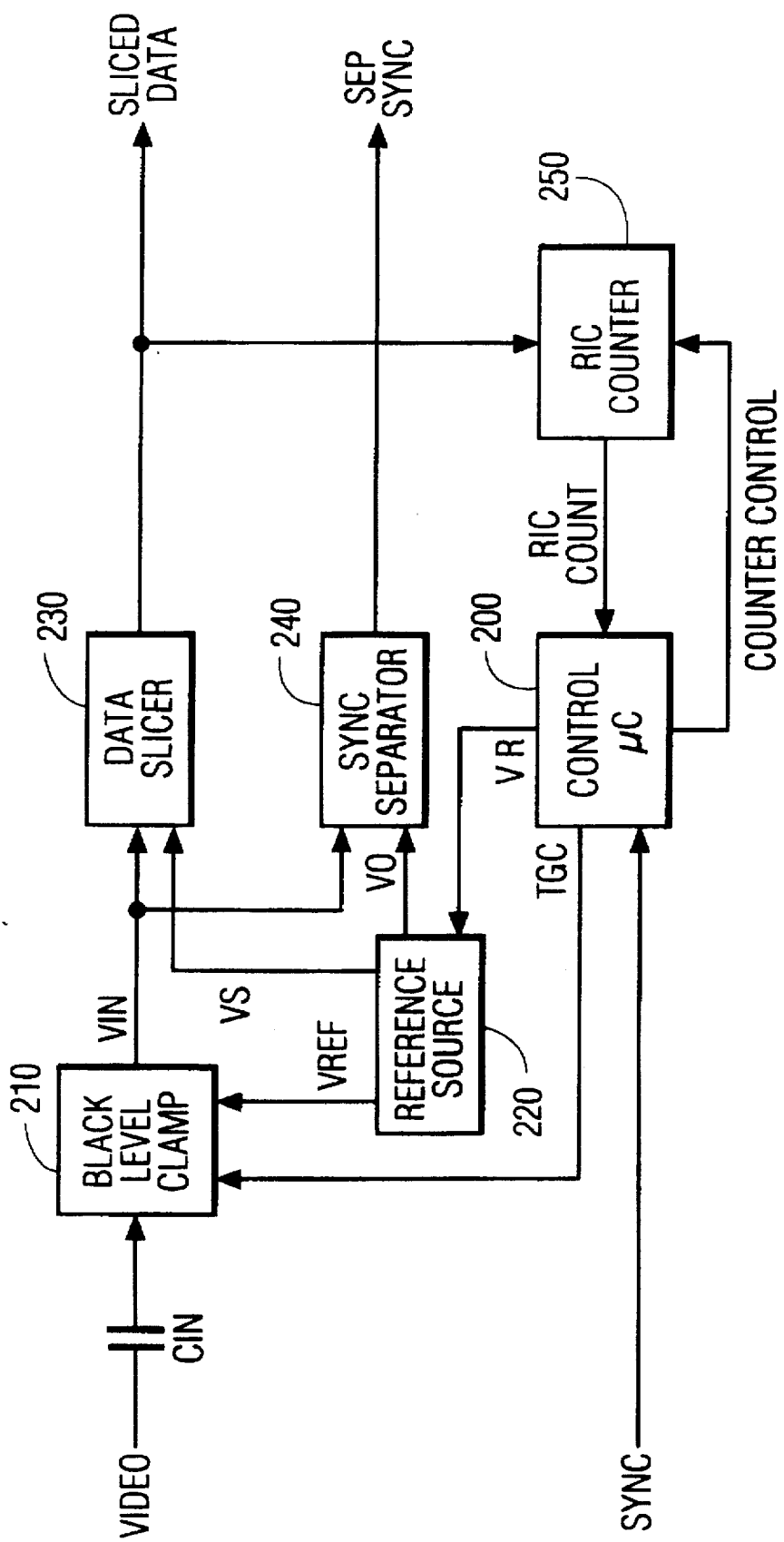
FIG. 2 shows in block diagram form a portion of a video signal processing system including auxiliary video signal extraction apparatus according to the present invention.

The portion of a video signal processing system that is illustrated in FIG. 2 will be described briefly followed by an in-depth discussion. In FIG. 2, coupling capacitor CIN couples input video signal VIDEO to black level clamp 210. A typical value for capacitor CIN is 1 µF. Black level clamp 210 is enabled to clamp the level of signal VIN to a level related to desired black level reference level VREF during intervals determined by control signal TGC from control µC 200, e.g Motorola MC68HC05. The operation of black level clamp 210 is described further below. Signal VIN at the output of black level clamp 210 is coupled to data slicer 230 and sync separator 240 which produce output signals SLICED DATA and SEP SYNC, respectively, by comparing signal VIN to respective reference voltage levels VS and V0.

Signal SLICED DATA is a binary representation of the information in signal VIN. Signal SEP SYNC is a synchronizing waveform having pulses corresponding to the synchronizing pulses in signal VIN. Because signal SEP SYNC is derived from the actual video signal, the sync pulses in signal SEP SYNC provide an accurate indication of when intervals of interest in the video signal, e.g. line 21, actually occur. Signal SEP SYNC may be used by circuits not shown in FIG. 2 that capture the binary auxiliary video information on signal SLICED DATA. For example, signal SEP SYNC may be used to generate an enable signal to enable data capture circuitry when binary values representative of auxiliary video information are occurring on signal SLICED DATA. As an example, the derived enable signal might enable a shift register to begin shifting in (capturing) data values on signal SLICED DATA.

Reference levels VREF, VS, and V0 are generated by reference source 220. Signal VR from control µC 200 is an input to reference source 220 that controls the value of reference level VS. As is described further below, the capability to vary reference level VS permits adapting the slicing level to the amplitude characteristics of video signal VIDEO.

In the embodiment illustrated in FIG. 2, adapting the slicing level also involves counter 250. Counter 250 is enabled to count pulses that occur on signal SLICED DATA during intervals defined by one or more control signals from control µC 200 that are labeled COUNTER CONTROL in FIG. 2. The counting intervals are established by control µC 200 to coincide with the intervals when the reference component (e.g. run-in clock or RIC) of an auxiliary video information signal is expected to occur. The count value is tested after the RIC interval ends. A count value equal to an expected value indicates that the expected number of RIC pulses have been detected demonstrating that the present slicing level is appropriate for extracting auxiliary video information. If the count value does not equal the expected value, the slicing level is adjusted by modifying the value of signal VS.

As an example of the described operation, control µC 200 monitors signal SYNC to determine when line 21 of field 1 occurs by counting line synchronizing pulses; of the signal sync. After a delay (e.g. either a software delay routine or a hardware delay) from the beginning of line 21, control µC 200 enables counter 250. The delay value is selected to be within the RIC interval. Counting is then enabled for a period that approximately spans an integral number of cycles of the RIC signal. If the slicing level is properly adjusted, the count value should equal the number of peaks of the RIC waveform that occur during the counting interval. Based on the timing shown in FIG. 1, a delay value of 12 µs and a counting interval of 8 µs should produce a count of 4 if the slicing level is adjusted properly (four cycles of the 500 kHz RIC waveform occur during an 8 µs counting interval).

Figure 3:
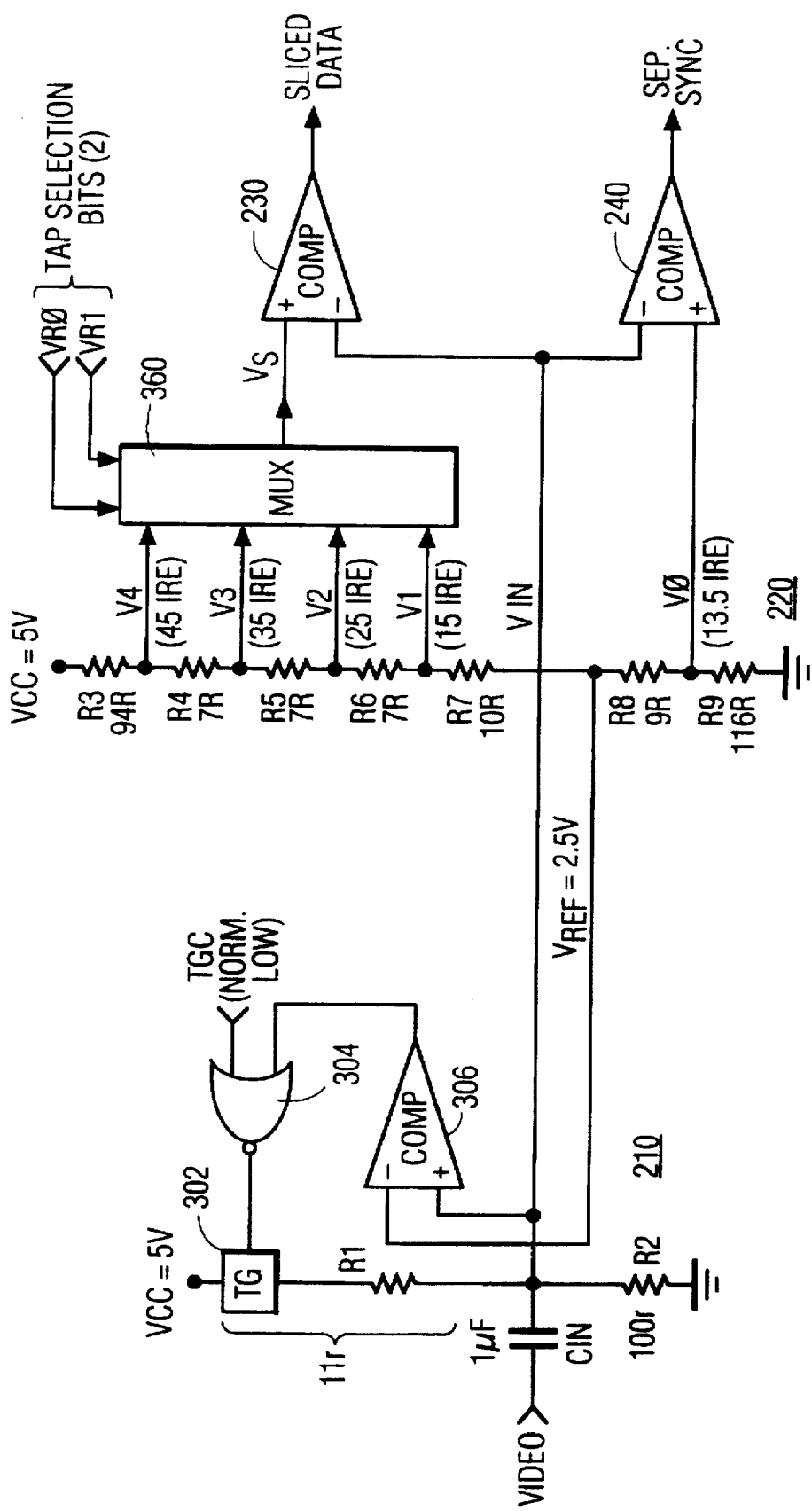
FIGS. 3 and 4 show, partially in schematic diagram form and partially in in block diagram form, embodiments of features that are shown in block diagram form in FIG. 2.
Figure 4:
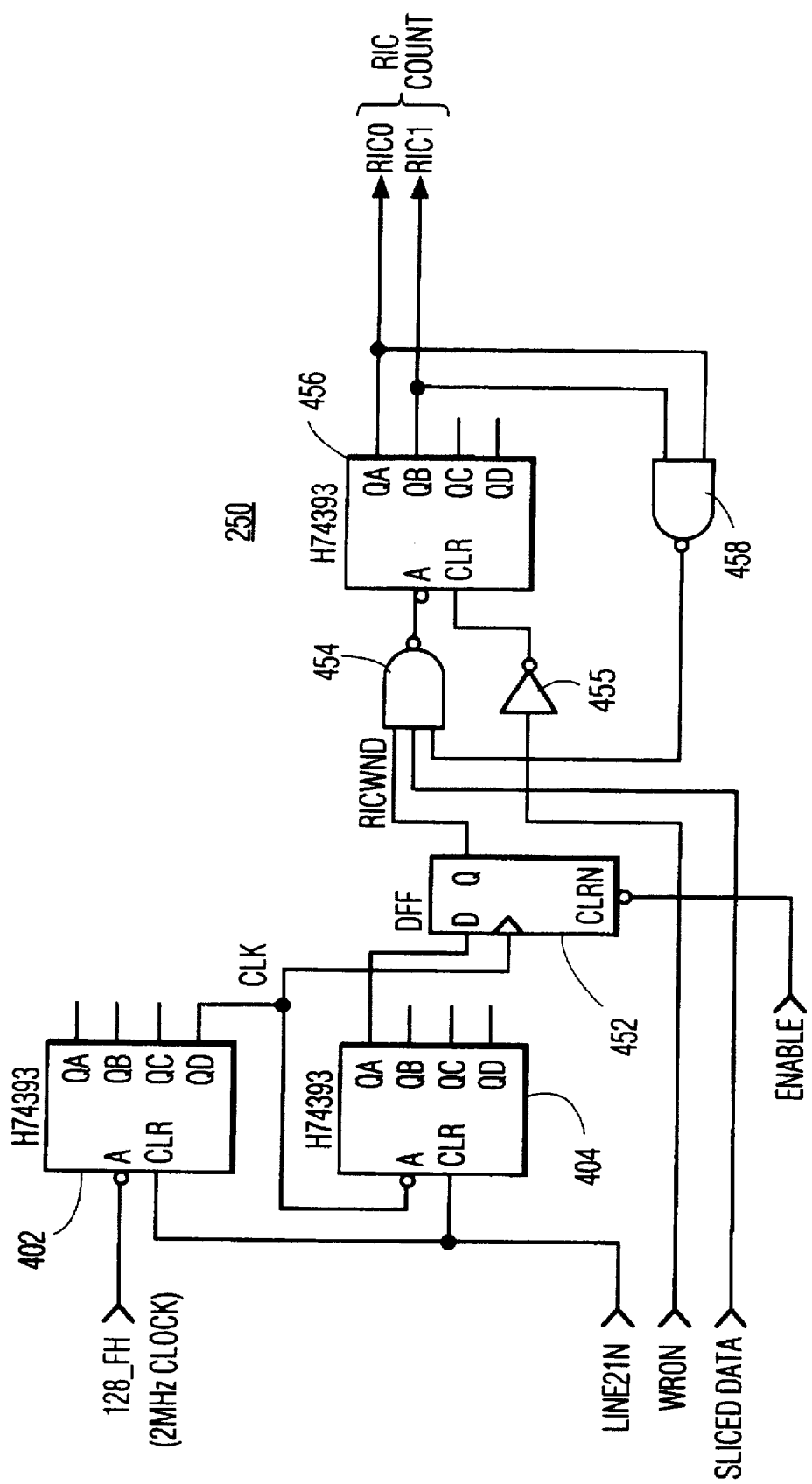

The above described features are illustrated in more detail in FIGS. 3 to 6. FIG. 3 shows an exemplary embodiment of black level clamp 210, reference source 220, data slicer 230, and sync separator 240 in FIG. 2. FIG. 4 shows an exemplary embodiment of run-in-clock (RIC) counter 250 in FIG. 2. Reference numerals that are the same in FIGS. 2 and 3, and that are the same in FIGS. 2 and 4 indicate corresponding features.

In FIG. 3, black level clamp 210 includes transmission gate (TG) 302, NOR gate 304, comparator 306, and resistors R1 and R2. Reference source 220 includes 4-to-1 MUX 360 and resistors R3 through R9. Comparators 230 and 240 are embodiments of data slicer 230 and sync separator 240, respectively.

In regard to black level clamp 210, the output of NOR gate 304 controls TG 302 such that TG 302 conducts coupling source VCC to resistor R1 when the output of NOR gate 304 is at logic 1. A logic 0 level at the output of NOR gate 304 causes TG 302 to become non-conductive decoupling source VCC from resistor R1. Typically, TG 302 is produced using MOSFET transistors. As a result, when TG 302 is conductive, it exhibits a characteristic resistance associated with the source-to-drain path through the MOSFET transistors. The value of the resistance depends on design parameters (e.g. transistor width) of the MOSFET transistors.

NOR gate 304 produces a logic 1 output causing TG 302 to conduct as long as control signal TGC from control µC 200 is at logic 0 and the output of comparator 306 is at logic 0. Comparator 306 compares the value of signal VIN to reference level VREF. Values of signal VIN that exceed reference level VREF cause the output of comparator 306 to go to logic 1, thereby causing TG 302 to be nonconductive. When conducting, TG 302 and resistor R1 exhibit a predetermined resistance ratio with respect to resistor R2 of 11:100 as shown in FIG. 3. The junction of resistors R1 and R2 is coupled to signal VIN creating a feedback loop.

Assuming signal TGC is at logic 0, the feedback loop and the resistor ratio operate in response to the video signal levels during the sync and blanking intervals in a horizontal line period to charge and discharge node VIN, thereby establishing the desired black level on signal VIN. More specifically, when TG 302 is disabled (non-conductive), the DC level at node VIN discharges via resistor R2. When TG 302 is enabled (conductive), node VIN charges via TG 302 and resistor R1 while discharging via resistor R2. The resistor ratio established by TG 302 and resistors R1 and R2 produces a charge rate that exceeds the discharge rate resulting in a net charging current to node VIN.

To better understand the operation of black level clamp 210, assume that node VIN is initially discharged to 0 volts. In this condition, the level of signal VIN during both sync and blanking intervals of a video line will be less than reference level VREF. Thus, a logic 0 is produced at the output of comparator 306, enabling TG 302 and causing node VIN to charge during both the sync and blanking periods. After a plurality of line intervals, the net charging current will have increased the DC level on node VIN until the level at node VIN exceeds reference level VREF during the blanking interval and is less than reference level VREF during the sync interval. As a result, during the blanking interval the output of comparator 306 will be at logic 1 which disables TG 302 and causes node VIN to discharge. During the sync interval, the level at node VIN during the sync interval is less than level VREF causing node VIN to charge.

The resistance values of the charge path (resistance of TG 302 plus resistor R1) and the discharge path (resistor R2) are selected such that discharge during the sync interval equals charge during the blanking period when the DC level at node VIN is approximately equal to level VREF. The resulting equilibrium condition clamps the DC level at node VIN to level VREF.

The described operation is based on a resistance ratio between the discharge-path and the charge-path that is determined for the sync and blanking intervals associated with a particular video signal specification. The resistance ratio of 100 R (discharge) to 11 R (charge) that is shown in FIG. 3 is suitable for NTSC standard signals. Other signal standards would require different ratios.

Establishing a clamping function based on resistor ratios is particularly desirable if clamp 210 is included in an integrated circuit (IC). Parameter variations luring IC production cause significant variations in specific resistor values. Resistor ratios, however, may be controlled to tight tolerances. Also, it should be noted that approaches to implementing black level clamp 210 other than that shown in FIG. 3 may be used.

As described, clamp 210 establishes a desired black level based on sync and blanking intervals having specific durations during each line interval. During the vertical interval, the sync and blanking intervals do not have fixed durations (e.g. wide vertical pulses and narrow equalizing pulses). If clamp 210 operated during the vertical interval, the varying pulse characteristics would cause clamp 210 to undesirably alter the black reference level on node VIN. To prevent the black level from changing significantly, control μC 200 sets signal TGC to logic 1 during the vertical interval disabling the feedback path of clamp 210 and causing node VIN to discharge relatively slowly via resistor R2 during the vertical interval. When clamp operation resumes following the vertical interval, the desired black level at node VIN is rapidly restored.

As mentioned above, FIG. 3 also shows an exemplary embodiment of reference source 220 from FIG. 2 that includes resistors R3 through R9 and MUX 360. Resistors R3 through R9 are configured as a resistor ladder that provides a plurality of reference levels having values that depend on the ratios of the resistor values. As previously discussed, specifying resistor ratios rather than particular resistor values is desirable for purposes of integrated circuit (IC) implementation.

Figure 5:
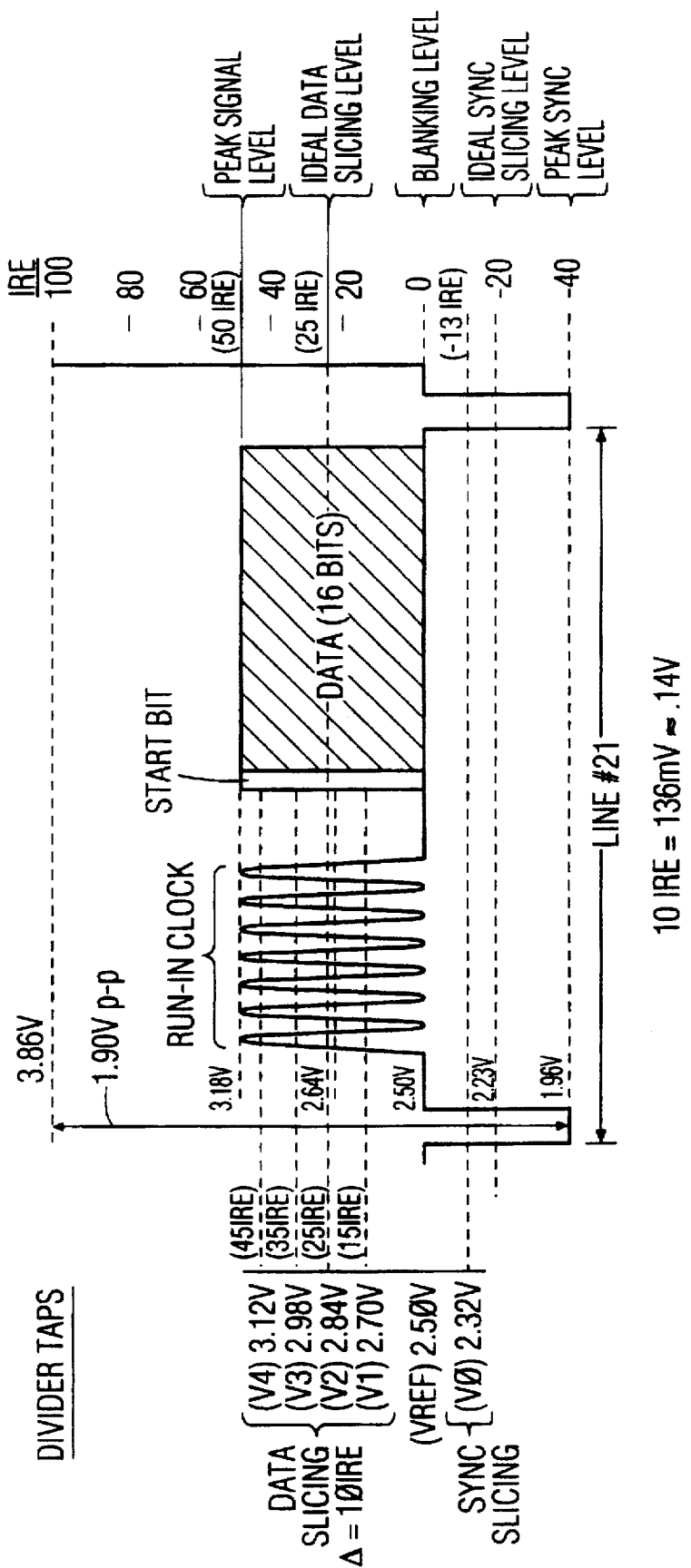
FIGS. 5, and 6 show video signal waveforms useful for understanding the operation of the apparatus shown in FIGS. 2, 3, and 4.

FIG. 5 shows the relationship between the reference levels generated by the arrangement in FIG. 3 and an exemplary video signal waveform that would have a maximum peak-to-peak (100 IRE) amplitude of 1.9 volts. The maximum white-going amplitude shown in FIG. 5 is 50 IRE which corresponds to the amplitude of an auxiliary information signal as shown in FIG. 1.

Data slicer reference level VS at the output of MUX 360 is coupled to one input of comparator 230 to establish the data slicing level. As explained further below, control signals VR0 and VR1 cause MUX 360 to select one of four values (V1=15 IRE, V2=25 IRE, V3=35 IRE, V4=45 IRE) for data slicer reference level VS. MUX 360 permits the data slicing level to be adapted to the video signal amplitude as desired. Reference level VREF for black level clamp 210 is produced at the resistive mid-point (i.e. junction of resistors R7 and R8 or 125 R of a total of 250 R)of the resistor ladder which is equivalent to 2.5 V for VCC equal to 5 V. Sync reference level V0 is produced at the junction of resistors R8 and R9 and is coupled to one input of comparator 240 to establish the sync slicing level.

Although a sync reference level of −20 IRE would appear to be desirable for a standard sync pulse amplitude of −40 IRE, FIG. 3 indicates that sync reference level V0 is approximately equal to −13.5 IRE. The indicated value of sync reference level V0 was selected because sync amplitude compression may occur in TV signals. For example, non-standard sync-to-video amplitude ratios may occur in signals extracted from video tapes. The selected sync reference level of −13.5 IRE permits comparator 240 to accurately separate sync pulses from a video signal having sync compressed in amplitude to ½ of its normal value.

The voltage selection provided by MUX 360 has been configured to provide a range of slicing levels for data slicer 230 sufficient to adapt the slicing voltage to a variety of video signal variations without requiring a large MUX. Limiting the size of MUX 360 is desirable to minimize the number of control signals required and the number of devices required to implement the MUX function. For example, in an integrated circuit (IC) implementation, increasing the size of the MUX requires more transistors and more area on the IC die. In an IC, MUX 360 requires only two control signals and may be implemented using four transmission gates.

FIG. 5 shows the voltages that correspond to the reference levels in FIG. 3 with respect to a 1.9 volt peak-to-peak video signal. The voltage V2 input to MUX 360 provides a slicing voltage of 2.84 volts as shown in FIG. 5 which is approximately equal to the 25 IRE level of a 1.9 V peak-to-peak video signal. Voltage V3 at 2.98 volts is a desirable slicing level for video signals having a positive offset of 10 IRE. This type of offset may occur in video signals recorded on video tape as part of an approach to preventing unauthorized duplication of prerecorded video programs.

Two additional bias voltages, i.e. voltages V1 and V4, can be selected for optimum data slicing to adapt the slicing level to large deviations of system parameters from their nominal values. Examples of these system parameters are:

(a) video input signal amplitude different from 1.9 V peak-to-peak (100 IRE white);

(b) offset voltage variations in data slicer comparator 230 (example: ±30 mV);

(c) variations in VCC for resistor ladder (example: ±5V);

(d) variations in resistor ratios in resistor ladder (example: ±2%).

One of the most significant parameters affecting the slicing level is variations in the video signal amplitude. Using the exemplary variations for the parameters listed above, the maximum combined contribution of items (b), (c), (d) can be calculated to offset the slicing level by 85 mV (6 IRE) from the nominal value.

Various modifications of the design of reference source 220 are apparent to one skilled in the art. For example, other resistor ladder configurations may be used, and MUX'es having a different number of inputs could be selected. Thus, the described embodiment may be adapted to a variety of video signal characteristics and standards.

As described above, run-in-clock (RIC) 250 counts pulses of the RIC signal at the output of data slicer 230 (signal SLICED DATA in FIGS. 2, 3, and 4) to produce count value RIC COUNT that is indicative of when slicing reference level VS is correctly adapted to the video signal. An embodiment of counter 250 shown in FIG. 4 includes counters 402, 404, and 456, D-type flip-flop (DFF) 452, NAND gates 454 and 458, and inverter 455. Count value RIC COUNT is represented by signals RIC0 and RIC1 that are produced at the two least significant outputs of counter 456 in FIG. 4.

Input signals to FIG. 4 include signal 128FH that serves as a clock signal for counter 402. Signal 128FH has a frequency that is 128 times horizontal frequency FH or approximately 2 MHz. Signal 128 FH may be produced at an output of a counter associated with a phase locked loop (PLL) in the deflection circuitry of a video receiver. Signal LINE21N is generated by μC 200 in FIG. 2 in response to synchronizing signal SYNC to indicate the occurrence of intervals in the video signal that are expected to include auxiliary video information, e.g. line 21 for closed caption applications. Signal LINE21N is used to reset counters 402 and 404, and may be generated by, for example, μC 200 counting line intervals as indicated by sync pulses in signal SYNC until the desired line number is located. Signals ENABLE and WRON enable and reset, respectively, counter 456 and may be generated by μC 200. Signal WRON resets counter 456 prior to beginning a count of RIC pulses.

Figure 6:
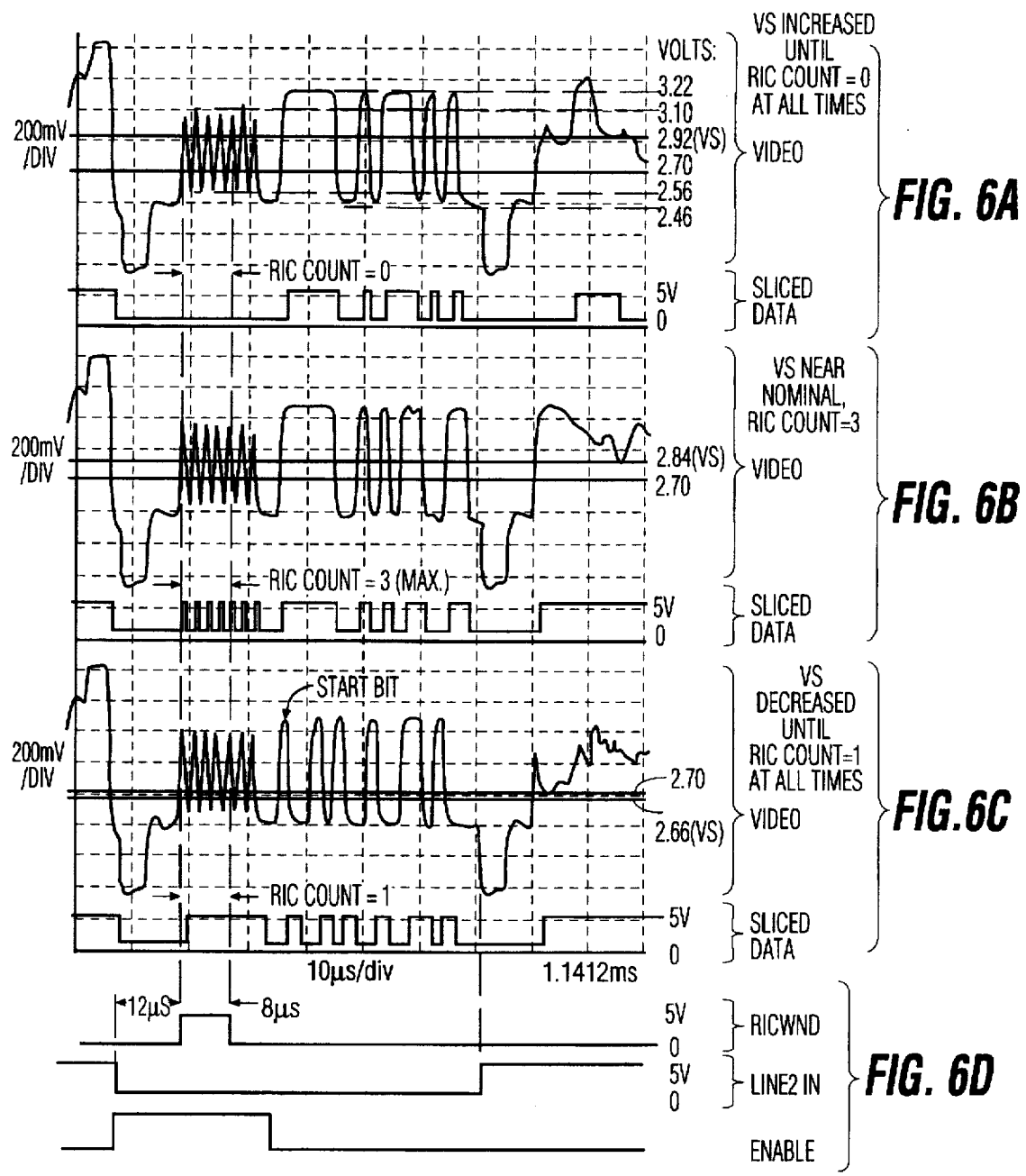

The timing of signals ENABLE and LINE21N is shown in FIG. 6. Signal LINE21N is at logic 1 to clear (reset) counters 402 and 404 at all times except during the interval when the auxiliary video information signal is expected to occur, e.g. line 21. Signal LINE21N then goes to logic 0 to enable counters 402 and 404. Signal ENABLE is at logic 1 only during an interval of approximately 25 μs at the beginning of line 21 to enable DFF 452.

Signal RICWND at the output of DFF 452 provides an 8 μs wide window pulse that begins 12 μs after the beginning of line 21 as shown in FIG. 6. The window pulse timing is selected to span an 8 μs portion of the RIC interval during line 21. The described timing of signal RICWND is generated as follows.

Both counter 404 and DFF 452 are clocked by signal CLK which is generated at the most significant output of 4-bit counter 402. Signal CLK changes every 8 cycles of the 2 MHz signal 128FH, or every 4 μs. Counters 402 and 404 are clocked by negative-going transitions (logic 1 to logic 0) in signal CLK while DFF 452 is clocked by positive-going transitions, (logic 0 to logic 1) in signal CLK.

The first transition on signal CLK after counters 402 and 404 are enabled is a positive-going transition that occurs 4 μs after signal LINE21N goes to logic 0. Although this transition clocks DFF 452, counter 404 is cleared (all outputs at logic 0) at this time because no negative-going transitions have occurred on signal CLK. As a result, a logic 0 is clocked into DFF 452 causing signal RICWND to remain at logic 0. A negative-going transition occurs on signal CLK at 8 μs after signal LINE21N goes to logic 0 causing the least significant output of counter 404 (and the D input to DFF 452) to go to logic 1. The next positive-going transition on signal CLK occurs at 12 μs after signal LINE21N goes to logic 0 causing signal RICWND to go to logic 1. At 16 μs after signal LINE21N goes to logic 0, a negative-going transition occurs on signal CLK causing the least significant output of counter 404 to go to logic 0. Thus, the next positive-going transition on signal CLK occurring at 20 μs after signal LINE21N goes to logic 0 clocks DFF 452 causing signal RICWND to go logic 0. The resulting window pulse on signal RICWND exhibits the desired 8 μs width and 12 μs delay with respect to the beginning of line 21 as shown in FIG. 6.

Counter 456 is enabled via NAND gate 454 for counting RIC pulses on signal SLICED DATA when signals WRON and RICWND are at logic 1, i.e. during the window pulse when counter 456 is not being reset. Counter 456 is disabled when a count of 3 (RIC0=RIC1=logic 1) is reached via NAND gate 458. A count of 3 indicates that the RIC signal is being sliced correctly. This feature prevents 4-bit counter 456 from "wrapping around" to a count of 0 after a count of 3 has been reached, thereby preventing a potential spurious count of 0 when the RIC signal is actually present and is being sliced correctly. Thus, a count of 3 actually indicates at least 3 pulses have occurred on signal SLICED DATA.

Modifications of the arrangement in FIG. 4 are possible. For example, 4-bit counters have been used for counters 404 and 456 because 4-bit counters are typical digital "building blocks". However, other devices may be used. Counter 404 could be replaced with a toggle flip-flop that is clocked by signal CLK. Counter 456 could be a 2-bit counter. In addition, count values other than 3, e.g. 2, 4 or 5, could be used to indicate the correct slicing of the RIC signal because 7 cycles of the RIC signal occur during the RIC interval. However, a value of 3 provides a degree of noise immunity in comparison to using a count of 2 while requiring fewer counter stages (only 2) than are needed for a count of 4 or 5 (3 counter stages). Also, it may be possible to eliminate counters 402 and 404 if another source of signal CLK and the input signal for DFF 452 exists in the video signal processing system. For example, the system may include an on screen display (OSD) feature that includes one or more counters for providing various signals at frequencies that are multiples of the horizontal line frequency FH.

Signals RIC0 and RIC1 in FIG. 4 are tested by μC 200 after the end of the 8 μs window interval to determine the count value. For the exemplary embodiment shown in FIGS. 2, 3, and 4, counting of the RIC signal pulses occurs when transitions of signal SLICED DATA clock counter 456. Thus, a count value of 0 (RIC0=RIC1=logic 0) results if no transitions occur, e.g. if data slicing reference level VS always exceeds the maximum RIC pulse amplitude. Similarly, a count value of 1 (RIC0=logic 1 and RIC1=logic 0) occurs when a single transition occurs on signal SLICED DATA. For example, when the slicing level is always less than the minimum value of the RIC waveform pulses, only one transition from the blanking level to the beginning of the RIC waveform occurs.

If the slicing level is set to a point between these two extreme values, the sensitivity of the disclosed system is such that deviations of the slicing level from the ideal slicing level (mid-point of the peak-to-peak range of the RIC signal) will not prevent the counter from being clocked to a count of 3. Experimental results have indicated that when a count of 3 is being generated, the system accurately extracts auxiliary video data. Thus, counts of 0 (slicing level too high), 1 (slicing level too low), or 3 (slicing level acceptable) can be expected as depicted in the waveforms for signal SLICED DATA that are shown in FIGS. 6A, 6C, and 6B, respectively.

Figure 11:
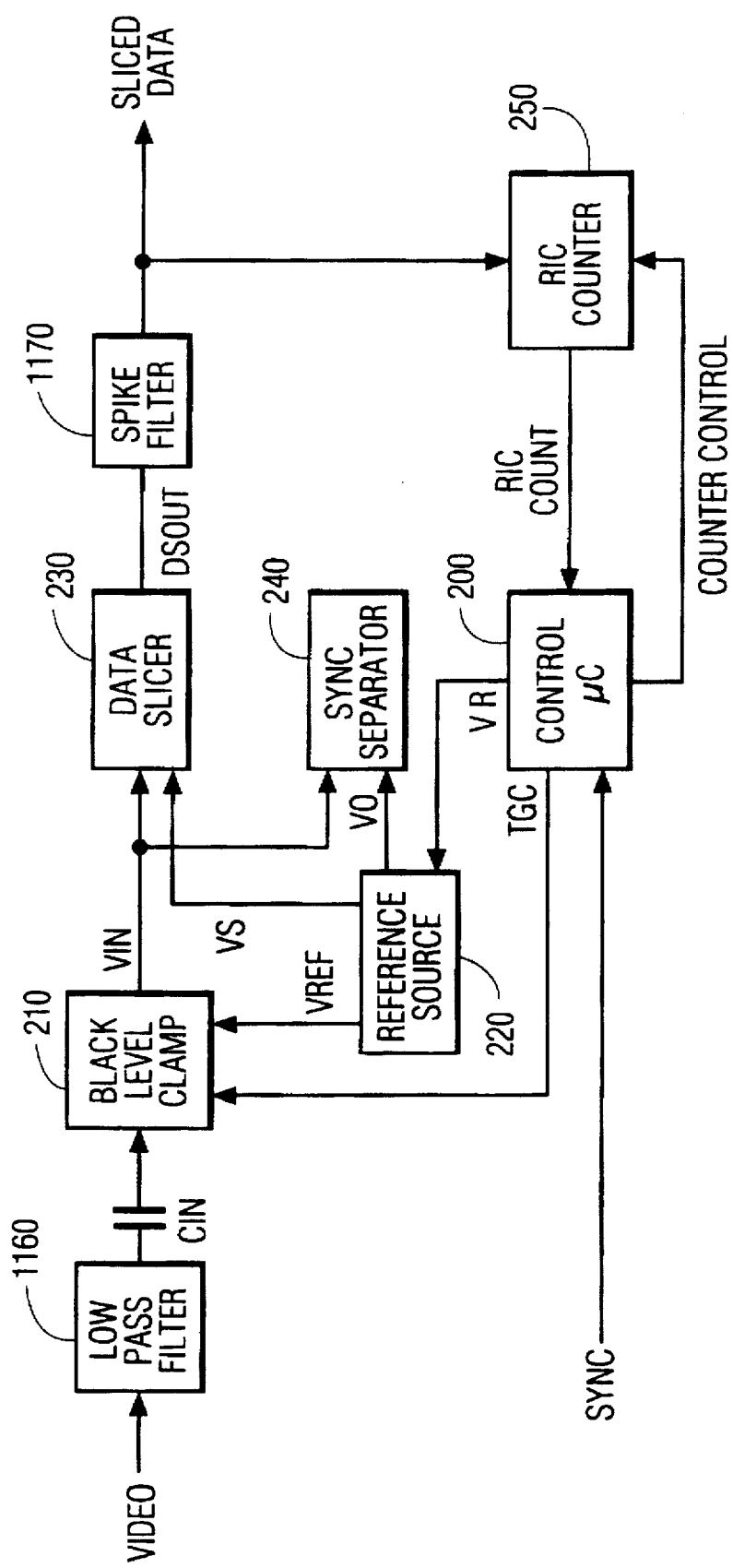
FIG. 11 shows a block diagram of an alternative embodiment of auxiliary video signal extraction apparatus according to the present invention.

In regard to FIGS. 6A and 6B, the RIC waveform shown exhibits spikes at the tips of the RIC waveform that extend beyond the slicing level. It would appear that these spikes might be sufficient to clock counter 456 such that RIC COUNT would not be 0 and 1 as shown in FIGS. 6A and 6C, respectively. However, signal SLICED DATA as shown in FIG. 6 was generated from signal VIDEO as shown in FIG. 6 using an alternative embodiment of the arrangement in FIG. 2. This alternative embodiment includes filtering features that are described further below and are shown in FIGS. 11 and 12. Briefly, the filtering removes the described spikes prior to 250 and low pass filters the video signal prior to data slicing. As shown in FIG. 6, the low pass filter reduces the amplitude of the RIC signal amplitude to a value that is less than the nominal 50 IRE amplitude shown in FIGS. 1 and 5.

As long as counts of 3 are being produced, there is no need to modify the slicing level. If µC 200 detects a count of 0, the slicing level may be decreased by µC 200 selecting a different value for signal VR in FIG. 2 (control signals VR0 and VR1 for MUX 360 in FIG. 3). For example, referring to FIG. 3, if the current value of slicing reference voltage VS is voltage V2, µC 200 could respond to a count of 0 by changing control signal VR to select voltage V1. Similarly, µC 200 could increase the slicing reference voltage in response to a count of 1 by changing control signal VR to select voltage V3 or V4. Thus, the slicing level can be modified rapidly in response to count values other than 3.

The described features provide data slicing level adjustment apparatus that rapidly adapts the slicing level to the video signal level. More specifically, the system can respond to changes in video signal levels during each video frame interval because the slicing level may be tested after each occurrence of line 21 in field 1. In addition, slicing level adjustment can operate continuously in the background under control of µC 200. Under certain conditions, however, it is desirable for the slicing level to be held constant despite changes in the video signal level. For example, the slicing level should remain constant during brief transients or signal "dropouts" to provide consistent data extraction when the normal signal level resumes.

The disclosed apparatus addresses conditions such as dropout by providing for monitoring the number of times that the various counts of 0, 1, and 3 occur. For example, if RIC COUNT is usually equal to 3 and a count of 0 or 1 occurs infrequently, it is likely that the slicing level is correct and that the occasional counts of 0 or 1 are being caused by effects such as signal dropout. Thus, no change in the slicing level is needed. If counts of 0 occur frequently, the slicing level is adjusted to a lower value while frequent counts of 1 cause the slicing level to be adjusted to a higher value.

The monitoring of the frequency of occurrence of particular count values could be accomplished by, for example, µC 200 executing a procedure that increments and decrements values stored in registers internal to µC 200. As an example, consider the flowchart shown in FIG. 7 that depicts the described monitoring operation of µC 200 using two registers designated RICCNT0 and RICCNT3 in the context of closed caption information. Register RICCNT0 serves as a "flag" that is set to indicate the occurrence of a count of 0. Register RICCNT3 is a multi-bit register having a value that is incremented and decremented as described below.

Figure 7:
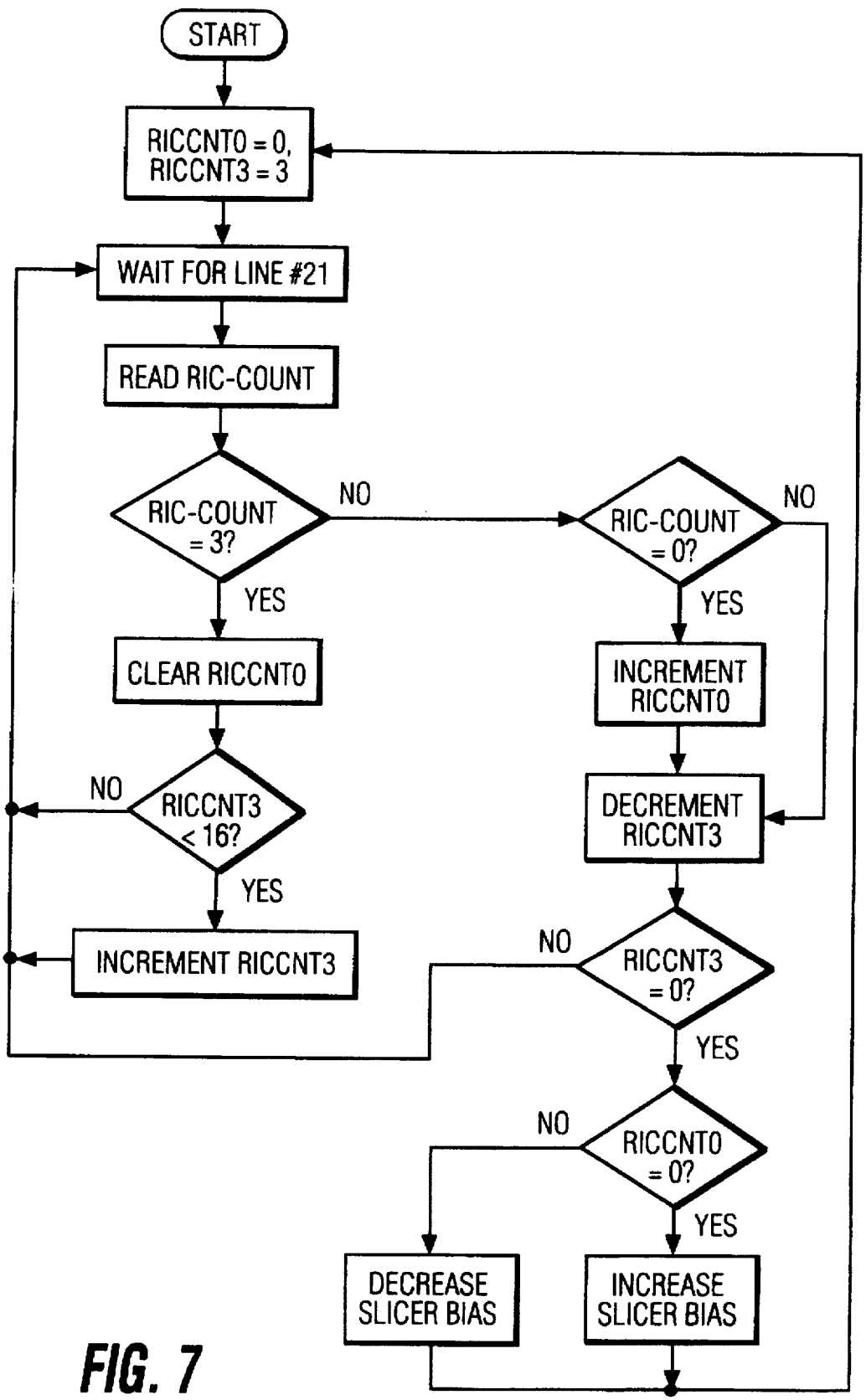
FIGS. 7 and 9 are flowcharts illustrating alternative operating modes of the apparatus shown in FIGS. 2, 3, and 4.

In FIG. 7, after initializing the registers, a new value of RIC COUNT is generated and tested. If RIC COUNT equals 3, the system presumes that a valid slicing level may exist. As a result, register RICCNT0 is cleared and the value in register RICCNT3 is incremented, i.e., value RICCNT3 is changed in a first direction, that value is less than a limit value, e.g. 16. Note that limit values other than 16, e.g. 7, may be used to reduce the number of register bits required to store the value of RICCNT3. When RIC COUNT is 0 rather than 3, RICCNT0 is set and RICCNT3 is decremented, i.e., value RICCNT3 is changed in a second direction opposite to the first direction. After decrementing, the value of RICCNT3 is tested. RICCNT3 equal to 0 indicates that RIC COUNT has not been 3 for a number of tests equal to the limit value (16 in FIG. 7) indicating that an adjustment of the slicing level is needed. If register RICCNT0 is set at this time, the value of RIC COUNT was 0 indicating that the slicing level should be increased. Register RICCNT0 being reset indicates that RIC COUNT was 1 (not 3 and not 0). As a result, the slicing level should be decreased.

Thus, the slicing level will not be adjusted until register RICCNT3 has a value of 0. As a result, the slicing level will be adjusted only after a delay has elapsed following the change of RIC COUNT from a value of three to a value that is not 3. For example, if RICCNT3 is 5, RIC COUNT has had a value of 3 for the previous 5 tests and the slicing level will not be adjusted unless the next 5 consecutive tests of RIC COUNT produce values other than 3. In this case, a delay of 5 test intervals is introduced before the slicing level is adjusted. The maximum delay is equal to the limit value for RICCNT3, e.g. 16 test intervals in FIG. 7. FIG. 8 shows a listing of a software program for a Motorola MC68HC05 processor corresponding to the flowchart in FIG. 7.

The approach illustrated in FIG. 7 adjusts the slicing level rapidly when necessary because the program either increases or decreases the slicing level as needed. As described above, this is accomplished by changing the value of control signals VR0 and VR1 for MUX 360 in FIG. 3. Control signals VR0 and VR1 may be generated at the outputs of a 2-bit counter. For example, incrementing the counter could produce a new value for signals VR0 and VR1 that would select a higher value for slicing reference level VS. Decrementing the counter would then select a lower slicing level.

For the exemplary embodiment shown in FIG. 3 where the number of possible reference levels is small, it may be unnecessary to include the capability to determine whether the slicing level should be increased or decreased. For example, if a 2-bit counter is used to generate signals VR0 and VR1, the counter could count in one direction only and select all possible reference levels if the counter is designed to wrap around. This approach is depicted in the flowchart shown in FIG. 9.

Figure 9:
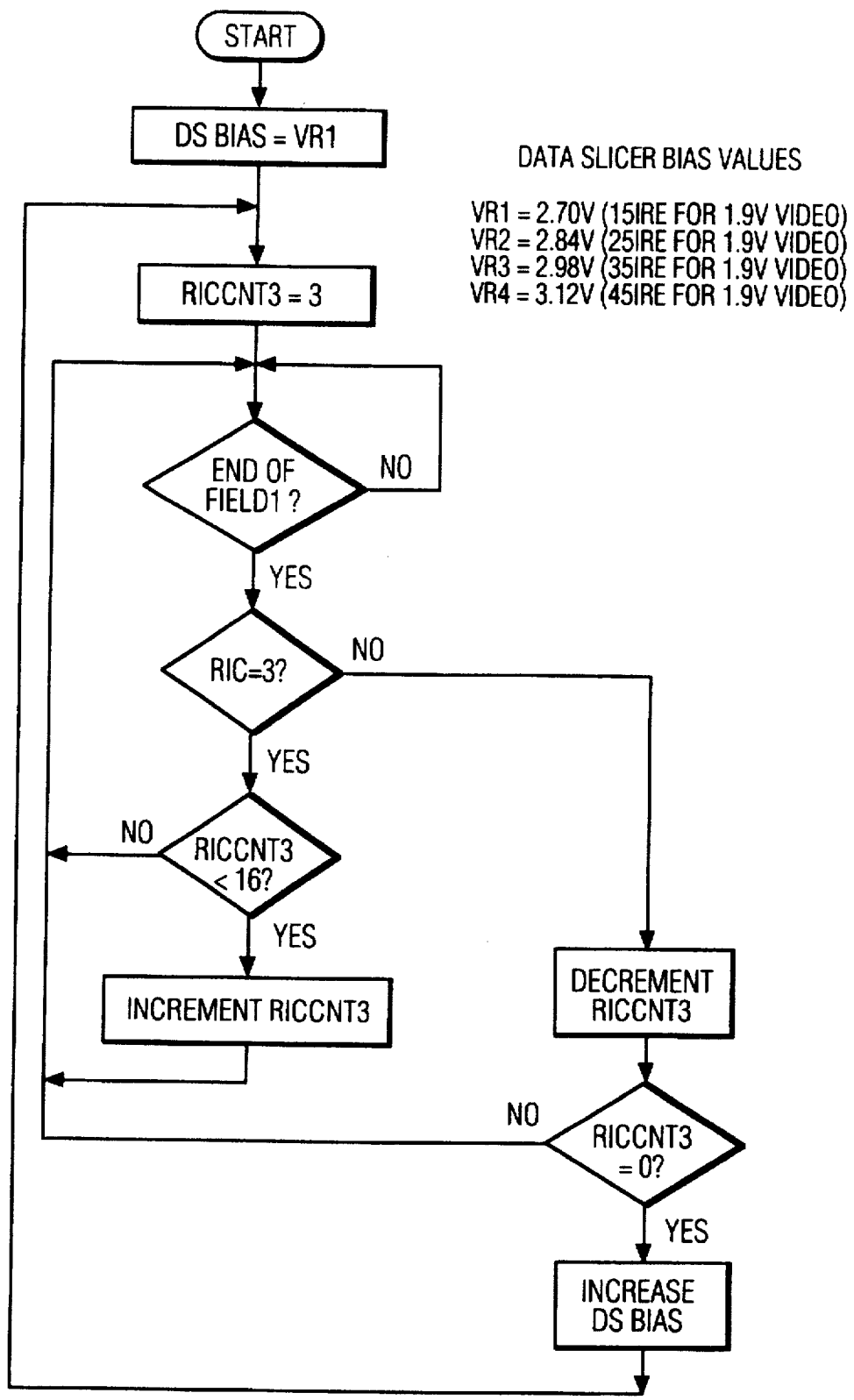

In FIG. 9, the only adjustment to the slicing level is to "increase" the slicing level. When the maximum slicing level is reached, e.g. voltage V4 in FIG. 3, the next "increase" will actually result in selecting the minimum slicing voltage, e.g. voltage V1 in FIG. 3. Thus, the voltage selection wraps around as described in the preceding paragraph. The approach illustrated in FIG. 9 may be slightly slower to reach an acceptable slicing level than the approach in FIG. 7 if the selection procedure must sequence through all possible slicing level values. However, implementing the approach of FIG. 9 in software requires fewer instructions as is apparent when comparing the exemplary program listing in FIG. 10 that corresponds to the flowchart in FIG. 9 to the program listing in FIG. 8.

As mentioned above, FIGS. 11 and 12 show an alternative embodiment for the apparatus in FIG. 2. The arrangement in FIG. 11 differs from that in FIG. 2 in that low-pass filter 1160 and spike filter 1170 are included. Features 200 through 250 in FIG. 11 correspond to features in FIG. 2 that are numbered the same.

Figure 12A:
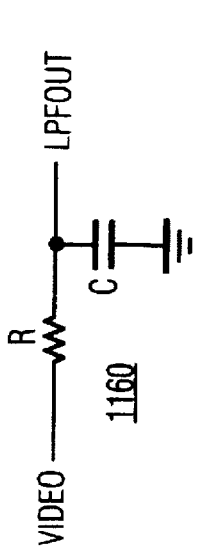
FIGS. 12A and 12B show, in circuit diagram form, exemplary embodiments of filter functions that are depicted in block diagram form in FIG. 11.

Low-pass 1160 filter may be implemented using a single-pole RC-type low pass filter such as that shown in FIG. 12A. The circuit shown in FIG. 12A has a pole at 700 KHz and reduces the amplitude of the 500 KHz run-in clock sinewave by about 80 percent from the nominal 50 IRE value (see FIGS. 1 and 5) as can be seen in FIG. 6. The reduction in the amplitude of the run-in clock relative to that of the data signal is advantageous because the range of RIC values is decreased correspondingly decreasing the adjustment range necessary for the slicing level.

Figure 12B:
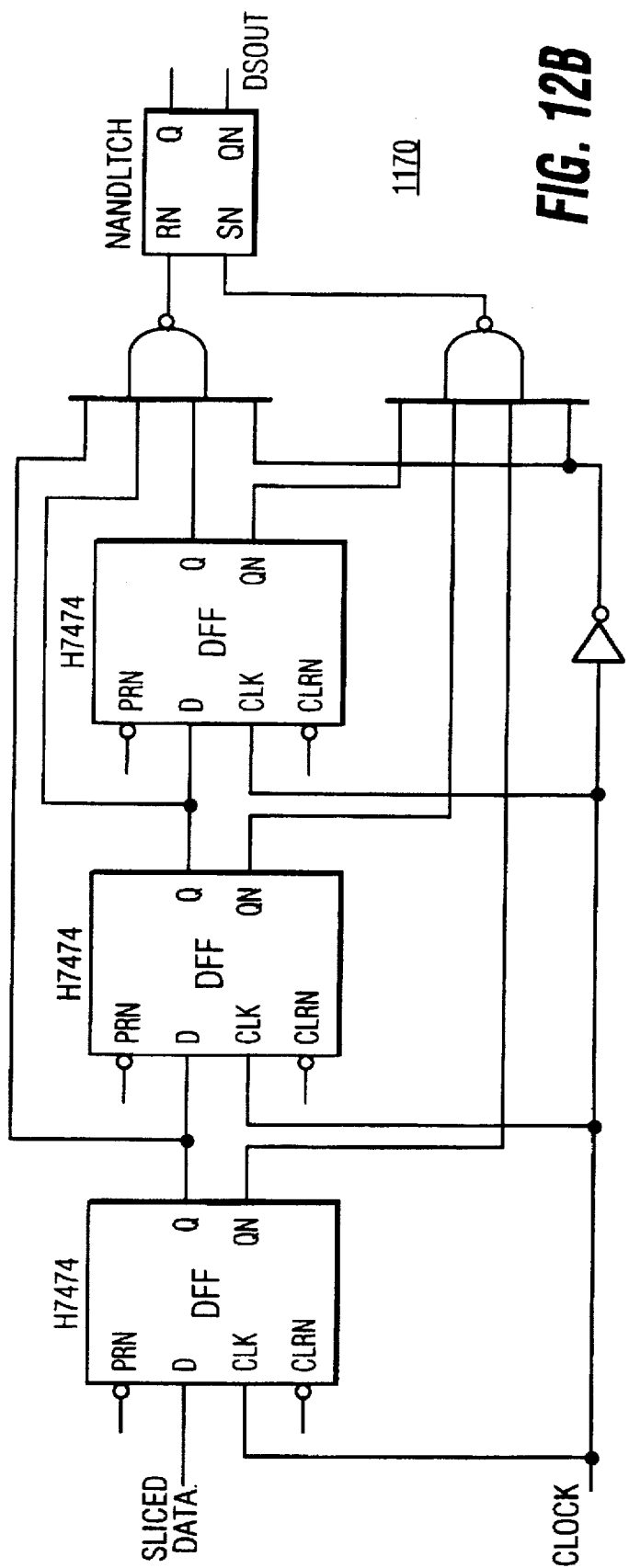

Spike filter 1170 is inserted into the signal path at the output of data slicer 230. Spike filter 1170 improves the accuracy with which the slicing level is set because, similarly to the action of the low-pass filter, the amplitude range of the RIC signal is decreased by eliminating the spike peaks on the RIC portion of the video waveform as shown in FIG. 6. A digital embodiment of the spike filter is shown in FIG. 12B. The circuit in FIG. 12B eliminates from the data slicer output all pulses narrower than 280ns and passes all pulses wider than 420ns. As a result, with the slicer bias at a value near the positive or negative tips of the run-in clock in the video input, the resulting output pulses of the data slicer are eliminated by the spike filter if they are sufficiently narrow. The effect of the spike filter is demonstrated by the waveforms shown in FIG. 6.

I claim:

1. Apparatus for processing a video signal having a reference signal component included in a plurality of horizontal display intervals of said video signal, said apparatus comprising:

means responsive to said video signal for producing an output signal having signal transitions corresponding to respective signal transitions of said reference signal component that cross a reference level;

means for modifying said reference level in response to a control signal;

a counter responsive to said output signal for producing a count representative of a number of said signal transitions of said output signal that occur during each interval included in said plurality of horizontal display intervals; and control means for determining after each interval included in said plurality of horizontal display intervals whether said count equals a predetermined value, for determining after said plurality of horizontal display intervals a frequency of occurrence of said count being equal to said predetermined value, and for generating said control signal to modify said reference level after said plurality of horizontal display intervals in response to said frequency of occurrence being less than a predetermined frequency of occurrence.

2. The apparatus of claim 1 wherein said control means produces a second count in response to said count produced by said counter;

said second count has a value corresponding to a value of said reference level;

said control means produces said control signal in response to said second count; and said control means changes said second count in only one direction for increasing said reference level and for decreasing said reference level.

3. The apparatus of claim 1 wherein said control means produces a second count in response to said count produced by said counter;

said control signal comprises a digital signal representative of said second count; and said reference level modifying means comprises a digital-to-analog converter responsive to said digital signal for producing said reference level.

4. The apparatus of claim 1 wherein said control means produces a second count;

said control means modifies said second count in a first direction when said count produced by said counter equals a first predetermined value;

said control means modifies said second count in a second direction opposite to said first direction when said count produced by said counter does not equal said first predetermined value; and said control means generates said control signal to modify said reference level when said second count is a second predetermined value after said plurality of horizontal display intervals.

5. The apparatus of claim 4 wherein said control signal represents a third count having a value corresponding to a value of said reference level; and said control means increases and decreases said reference level by changing said third count in only one direction.

6. The apparatus of claim 5 wherein said reference signal component exhibits a plurality of periodic amplitude variations during each interval included in said plurality of horizontal display intervals; and said count representative of said number of said signal transitions represents a number of amplitude variations in said output signal corresponding to respective ones of said periodic amplitude variations in said reference signal component.

7. The apparatus of claim 6 further comprising a filter means in said video signal path for substantially preventing amplitude variations in said video signal other than said periodic amplitude variations of said reference signal component from affecting said count representative of said number of said signal transitions; said filter means comprising a low pass filter coupling said video signal to an input of said output signal producing means, and a spike filter coupling said output signal to said counter.

8. Apparatus for processing a video signal having a reference signal component included in a reference signal interval during each of a plurality of horizontal display intervals of said video signal, said apparatus comprising:

means for determining a number of signal transitions of said reference signal component that cross a reference level during each of said reference signal intervals; and means for modifying said reference level after said plurality of horizontal display intervals in response to said number being less than a predetermined number during more than one of said reference signal intervals.

9. Apparatus of claim 8 further comprising means for providing an output signal having signal transitions produced in response to respective signal transitions of said reference signal component that cross a reference level; and wherein said means for determining said number of signal transitions comprises a counter responsive to said output signal for producing during each of said reference signal intervals a count representative of said number of signal transitions; and wherein said means for modifying said reference level comprises means for evaluating said count after each of said reference signal intervals and for determining how frequently said count represents said predetermined number.

10. Apparatus of claim 9 wherein said means for evaluating said count comprises a second counter for producing a second count; said second count being incremented after each of said reference signal intervals that produces a value of said first count less than said predetermined number; said second count being incremented after each of said reference signal intervals that produces a value of said first count equal to or greater than said predetermined number;

said means for modifying said reference level increases said reference level in response to said first count being a first value after said more than one of said reference signal intervals and said number of said signal transitions crossing said reference level being less than said predetermined number during each interval included in said more than one of said reference signal intervals; and said means for modifying said reference level decreases said reference level in response to said first count being a second value after said more than one of said reference signal intervals and said number of said signal transitions crossing said reference level being less than said predetermined number during each interval included in said more than one of said reference signal intervals.

11. Apparatus of claim 9 wherein said means for modifying said reference level causes a modification of said reference level without determining whether said modification should be an increase of said reference level or a decrease of said reference level.

12. Apparatus of claim 11 further comprising means for establishing said reference level in response to a binary value; and wherein said means for modifying said reference level modifies said binary value in only one direction for increasing said reference level and for decreasing said reference level.

13. Apparatus of claim 9 wherein each horizontal display interval included in said plurality of horizontal display intervals occurs during a respective one of a plurality of video frame intervals included in said video signal; said plurality of video frame intervals occurring consecutively in said video signal.

14. Apparatus for processing a video signal having a reference signal component occurring during a reference signal interval included in each of a plurality of horizontal display intervals of said video system, said apparatus comprising:

means for determining during each of said reference signal intervals whether said reference signal component exhibits a predetermined relationship to a reference level; and means for modifying said reference level after a delay including said plurality of horizontal display intervals; said delay beginning in response to said reference signal component and said reference level exhibiting a relationship other than said predetermined relationship; said reference signal component and said reference level exhibiting said relationship other than said predetermined relationship during more than one of said reference signal intervals included in said delay.

15. Apparatus of claim 14 wherein said means for performing said comparison comprises means for producing an output signal having signal transitions produced in response to signal transitions of said reference signal component that cross a reference level during each of said reference signal intervals;

said means for modifying said reference level comprises means responsive to said output signal for determining a number of said signal transitions of said reference signal component that cross said reference level during each of said reference signal intervals;

said delay beginning in response to said number being less than a predetermined number;

said number being less than said predetermined number during more than one of said reference signal intervals included in said delay.

16. Apparatus of claim 15 wherein said means for determining said number of said signal transitions comprises a counter responsive to said output signal for producing a first count representative of said number of said signal transitions;

said means for modifying said reference level comprises means for evaluating said first count after each reference signal interval included in said plurality of horizontal display intervals, and for producing a second count representing a number of said reference signal intervals during which said first count represents said predetermined number.

17. Apparatus of claim 16 wherein said delay ends in response to said second count representing a second predetermined number.

18. Apparatus of claim 17 wherein said means for modifying said reference level increases said reference level in response to said second count being said second predetermined number and said first count being a third predetermined number; and said means for modifying said reference level decreases said reference level in response to said second count being said second predetermined number and said first count being a fourth predetermined number.

19. Apparatus of claim 17 wherein said means for modifying said reference level causes a modification of said reference level without determining whether said modification should be an increase of said reference level or a decrease of said reference level.

20. Apparatus of claim 19 further comprising means responsive to a control signal for producing said reference level; and wherein said means for modifying said reference level includes means for producing a third count representing a value of said control signal, and for modifying said third count for modifying said reference level; said third count being modified in only one direction for increasing said reference level and for decreasing said reference level.

21. Apparatus for decoding auxiliary information included in a video signal comprising:

means for producing a first count representative of a number of signal transitions of said video signal that cross a reference level during each interval included in a plurality of intervals;

means responsive to a binary value for providing said reference level; and control means responsive to said first count for modifying said binary value in only one direction for changing said reference level such that said first count tends to become a predetermined count; said reference level being increased and decreased in response to said binary value being modified in only said one direction.

22. Apparatus of claim 21 wherein each interval included in said plurality of intervals includes a respective portion of a reference signal component of said video signal;

each of said respective portions of said reference signal component comprises a plurality of periodic amplitude variations;

said means for producing said first count comprises a data slicer for providing an output signal having signal transitions produced in response to respective signal transitions of said video signal that cross said reference level; and a counter responsive to said output signal for producing said first count;

said control means comprises means for evaluating said first count after each interval included in said plurality of intervals, and for producing a second count representing a number of said intervals during which said first count represents a predetermined number.

23. Apparatus of claim 22 wherein said control means modifies said binary value in response to said second count representing a second predetermined number.

* * * * *